(12) United States Patent
Iwano

(10) Patent No.: US 10,336,010 B2
(45) Date of Patent: Jul. 2, 2019

(54) RESIN BODY AND MANUFACTURING METHOD OF RESIN BODY

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 15/350,819

(22) Filed: Nov. 14, 2016

(65) Prior Publication Data

US 2017/0151707 A1 Jun. 1, 2017

(30) Foreign Application Priority Data

Nov. 30, 2015 (JP) .................. 2015-234016

(51) Int. Cl.
| | | |
|---|---|---|
| *B32B 3/30* | (2006.01) | |
| *B32B 3/04* | (2006.01) | |
| *B32B 3/08* | (2006.01) | |
| *B32B 3/12* | (2006.01) | |
| *B29C 69/00* | (2006.01) | |
| *B29C 70/74* | (2006.01) | |
| *B32B 5/02* | (2006.01) | |
| *B32B 27/20* | (2006.01) | |
| *B32B 27/32* | (2006.01) | |

(Continued)

(52) U.S. Cl.
CPC .............. *B29C 69/00* (2013.01); *B29C 64/00* (2017.08); *B29C 70/74* (2013.01); *B32B 3/04* (2013.01); *B32B 3/08* (2013.01); *B32B 3/30* (2013.01); *B32B 5/02* (2013.01); *B32B 27/20* (2013.01); *B32B 27/32* (2013.01); *B32B 27/34* (2013.01); *B32B 27/38* (2013.01); *B29C 45/14311* (2013.01); *B29C 45/14819* (2013.01); *B29L 2031/608* (2013.01); *B32B 2250/40* (2013.01); *B32B 2260/023* (2013.01); *B32B 2260/046* (2013.01); *B32B 2262/02* (2013.01); *B32B 2262/04* (2013.01); *B32B 2262/062* (2013.01); *B32B 2262/10* (2013.01); *B32B 2262/106* (2013.01); *B32B 2307/50* (2013.01); *B32B 2307/54* (2013.01); *B32B 2605/00* (2013.01)

(58) Field of Classification Search
None
See application file for complete search history.

(56) References Cited

U.S. PATENT DOCUMENTS

| | | | | |
|---|---|---|---|---|
| 4,954,382 A | * | 9/1990 | Riefler | B29C 70/086 428/116 |
| 5,087,500 A | * | 2/1992 | Kasper | B32B 3/12 428/116 |

(Continued)

FOREIGN PATENT DOCUMENTS

| | | |
|---|---|---|
| CN | 102202881 A | 9/2011 |
| DE | 4401461 A1 | 7/1995 |

(Continued)

*Primary Examiner* — Peter A Salamon
(74) *Attorney, Agent, or Firm* — Oliff PLC

(57) ABSTRACT

A resin body includes: a core member including an internal structure and a planar structure covering the internal structure; and a resin face material containing resin and joined so as to cover a surface of the planar structure on an opposite side to a side where the planar structure covers the internal structure.

8 Claims, 2 Drawing Sheets

(51) Int. Cl.
*B32B 27/34* (2006.01)
*B32B 27/38* (2006.01)
*B29C 64/00* (2017.01)
B29L 31/60 (2006.01)
B29C 45/14 (2006.01)

(56) References Cited

U.S. PATENT DOCUMENTS

| | | | | |
|---|---|---|---|---|
| 5,238,725 A | * | 8/1993 | Effing | B29B 13/023 428/116 |
| 2002/0121714 A1 | * | 9/2002 | Preisler | B29C 45/14 264/46.4 |
| 2010/0261025 A1 | * | 10/2010 | Miyamoto | B29C 45/14311 428/458 |
| 2011/0250384 A1 | * | 10/2011 | Sumi | B60R 5/044 428/118 |
| 2015/0182811 A1 | * | 7/2015 | Bender | A63B 45/00 473/376 |

FOREIGN PATENT DOCUMENTS

| | | |
|---|---|---|
| FR | 2440261 A1 | 5/1980 |
| GB | 2285598 A | 7/1995 |
| JP | H10-329250 A | 12/1998 |
| JP | 2006-205436 A | 8/2006 |
| JP | 2008-231490 A | 10/2008 |
| JP | 2009-149018 A | 7/2009 |
| JP | 2011-207403 A | 10/2011 |
| JP | 2011-224989 A | 11/2011 |

* cited by examiner

RESIN BODY AND MANUFACTURING METHOD OF RESIN BODY

INCORPORATION BY REFERENCE

The disclosure of Japanese Patent Application No. 2015-234016 filed on Nov. 30, 2015 including the specification, drawings and abstract is incorporated herein by reference in its entirety.

BACKGROUND

1. Technical Field

The present disclosure relates to a resin body and a manufacturing method of a resin body.

2. Description of Related Art

There has been disclosed a sandwich panel for multiple-order curved surface molding. The sandwich panel is constituted by a hollow core material in which a honeycomb shape or a polyhedral shape is formed in a layered manufacturing method represented by an optical molding method, a power molding method, or the like, and front and back face plates made of fiber reinforced plastic or the like, and the sandwich panel is subjected to curved surface molding as various structures (see Japanese Patent Application Publication No. 2011-224989 (JP 2011-224989 A), for example).

In the sandwich panel for multiple-order curved surface molding, described in JP 2011-224989 A, an inner part of the hollow core material has a honeycomb shape or the like, and the face plates and the hollow core material are bonded to each other by line bonding or spot bonding, which causes such a problem that a bonding strength of the face plates to the hollow core material is insufficient. Further, there is such a problem that a material and a size of the honeycomb are limited, and further, a whole strength is insufficient.

SUMMARY

The present disclosure provides a resin body excellent in a bonding strength and having a high rigidity and a high strength, and a manufacturing method of the resin body.

A resin body according to first aspect of the disclosure includes: a core member including an internal structure and a planar structure covering the internal structure; and a resin face material containing resin and joined so as to cover a surface of the planar structure on an opposite side to a side where the planar structure covers the internal structure. The internal structure may be topologically optimized.

According to the above configuration, since the core member includes the planar structure and the resin face material is joined thereto so as to cover the surface of the planar structure, the resin face material is joined to the planar structure of the core member by face bonding, thereby making it possible to increase a bonding strength of the resin face material to the core member in comparison with line bonding or spot bonding. Further, since the core member includes the topologically optimized internal structure, the resin body including the core member has a high rigidity and a high strength.

In the resin body described above, the resin may be thermoplastic resin or thermosetting resin.

According to the above configuration, the core member can be joined to the resin face material containing the thermoplastic resin or the thermosetting resin by deposition, insert molding, and the like, for example. On that account, an adhesive is unnecessary to join the resin face material to the core member, thereby making it possible to attain a weight reduction of the resin body and a reduction in a manufacturing cost.

In the resin body described above, the resin may be fiber reinforced resin to which a fiber is added.

According to the configuration, it is possible to further increase strength of the resin face material.

In the resin body described above, the planar structure may have an uneven portion on its surface.

According to the above configuration, it is possible to further improve the bonding strength between the planar structure and the resin face material by an anchor effect, and it is possible to firmly integrate the core member with the resin face material.

A manufacturing method of a resin body, according to a second aspect of the disclosure, is a manufacturing method for manufacturing the aforementioned resin body, and includes: a step of manufacturing the core member; and a step of joining the resin face material so as to cover the surface of the planar structure.

According to the above configuration, since the resin face material is joined so as to cover the surface of the planar structure on an opposite side to a side where the planar structure covers the internal structure, the resin face material is joined to the planar structure of the core member by face bonding, thereby making it possible to manufacture a resin body having a high bonding strength of the resin face material to the core member in comparison with line bonding or spot bonding. Further, since the core member manufactured hereby includes the topologically optimized internal structure, it is possible to manufacture a resin body having a high rigidity and a high strength.

In the manufacturing method described above, in the step of joining, the resin face material may be joined by insert molding so as to cover the surface of the planar structure.

According to the above configuration, since an adhesive is unnecessary to join the core member to the resin face material, it is possible to shorten a step operation time and further to achieve a weight reduction of the resin body and a reduction in a manufacturing cost.

In the manufacturing method described above, the resin may be thermoplastic resin; and in the step of joining, the resin face material may be joined by deposition so as to cover the surface of the planar structure.

According to the above configuration, since an adhesive is unnecessary to join the core member to the resin face material, it is possible to shorten a step operation time and further to achieve a weight reduction of the resin body and a reduction in a manufacturing cost.

According to the present disclosure, it is possible to provide a resin body excellent in a bonding strength and having a high rigidity and a high strength, and a manufacturing method of the resin body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
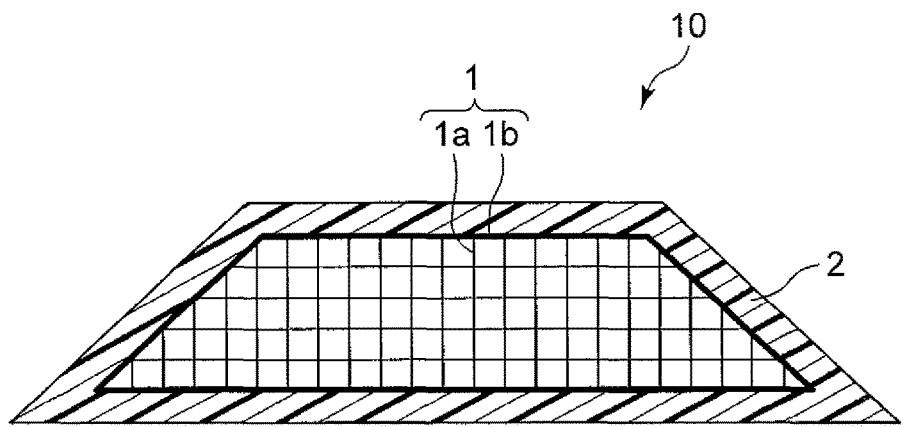
FIG. 1 is a sectional view illustrating a schematic configuration of a resin body according to one embodiment of the present disclosure.

[Resin Body] The following describes a resin body according to one embodiment of the present disclosure with reference to FIG. 1. FIG. 1 is a sectional view illustrating a schematic configuration of the resin body according to one embodiment of the present disclosure. A resin body 10 according to one embodiment of the present disclosure includes: a core member 1 including a topologically optimized internal structure 1a and a planar structure 1b covering the internal structure a; and a resin face material 2 containing resin and joined so as to cover a surface of the planar structure 1b. In the resin body 10 according to the present embodiment, the internal structure 1a of the core member 1 is not a honeycomb structure, but a structure topologically optimized. A resin body having a honeycomb structure as an internal structure is unfavorable because the following problems occur.

Figure 3:
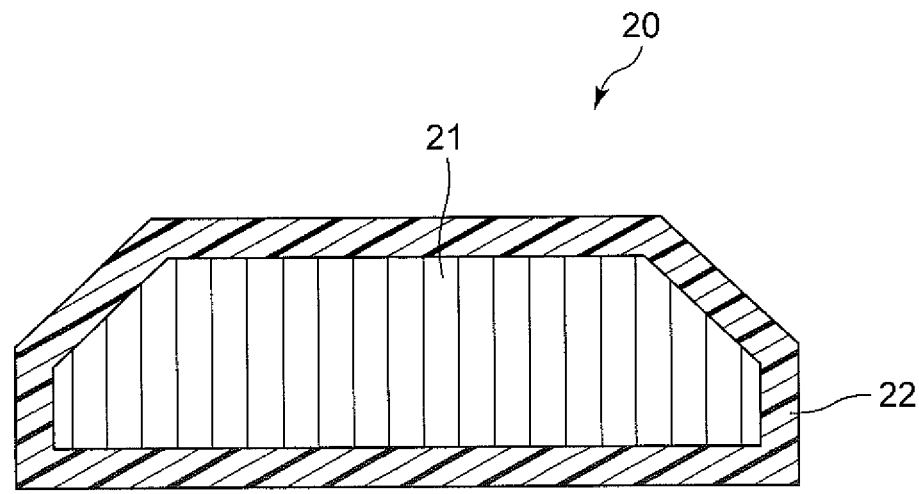
FIG. 3 is a sectional view illustrating a schematic configuration of a resin body as a subject for comparison in the present disclosure.

FIG. 3 is a sectional view illustrating a schematic configuration of a resin body as a subject for comparison in the present disclosure. A resin body 20 illustrated in FIG. 3 includes a core member 21 having a honeycomb structure as an internal structure, and a resin face material 22 joined to the core member 21 so as to cover a surface of the core member 21.

In a case where the internal structure of the core member 21 is the honeycomb structure, there is such a problem that a material for forming the honeycomb structure and a specification of its size are limited. Further, the honeycomb structure of the core member 21 is joined to the resin face material 22 by spot bonding or line bonding, which causes such a problem that a bonding strength of the resin face material 22 to the core member 21 is insufficient in the resin body 20.

Further, in a case where the internal structure of the core member 21 is the honeycomb structure, a large section effect by the honeycomb structure is obtained at the time of bending and compression in a plate-thickness direction, but the section effect by the honeycomb structure is small at the time of shearing and compression in a vertical direction to the plate thickness, which causes a concern about an insufficient strength.

Further, when resin contained in the resin face material 22 flows into the honeycomb structure of the core member 21, a resin-containing ratio in the resin face material 22 containing fiber reinforced resin decreases, which decreases strength of the resin face material.

Figure 4:
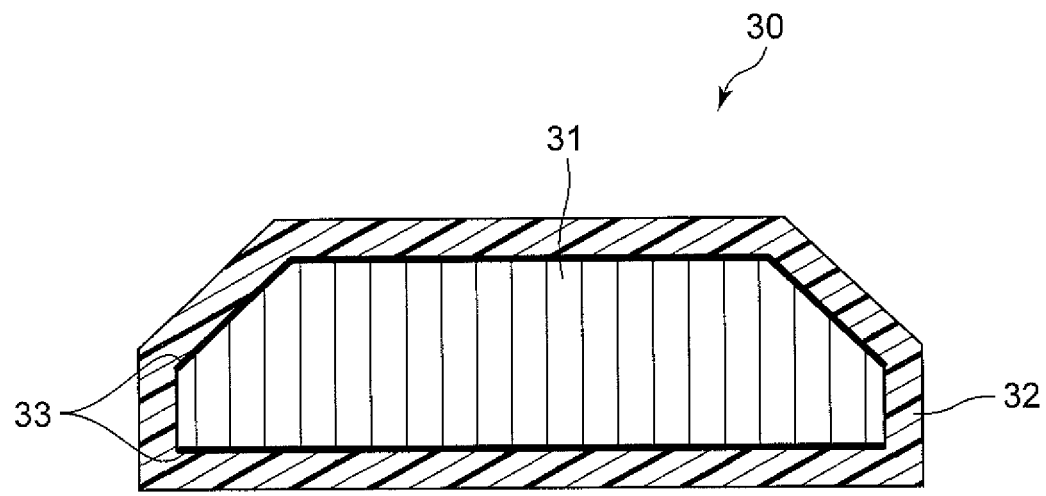
FIG. 4 is a sectional view illustrating a schematic configuration of another resin body as a subject for comparison in the present disclosure.

Subsequently, FIG. 4 is a sectional view illustrating a schematic configuration of another resin body as a subject for comparison in the present disclosure. A resin body 30 illustrated in FIG. 4 includes a core member 31 having a honeycomb structure as an internal structure, and a resin face material 32. The core member 31 is joined to the resin face material 32 via an adhesive film 33.

When the core member 31 having the honeycomb structure as the internal structure is joined to the resin face material 32 via the adhesive film 33, inflow of resin contained in the resin face material 32 into the honeycomb structure is restrained. However, since it is necessary to provide the adhesive film 33 separately, there is such a problem that the number of routines increases and a mass of the resin body 30 increases by providing the adhesive film 33. Further, even in a case where the adhesive film 33 is provided, the honeycomb structure in the core member 31 is joined to the resin face material 32 via the adhesive film 33 by spot bonding or line bonding, so it cannot be said that a bonding strength of the resin face material 32 to the core member 31 is sufficient.

In the meantime, the resin body 10 of the present embodiment includes the core member 1 having the topologically optimized internal structure 1a, and the internal structure 1a has rigidity and strength. Further, due to the topologically optimized internal structure 1a, the rigidity is balanced with a weight reduction.

Further, unlike the honeycomb structure, a material and a specification of a size are not limited in the topologically optimized internal structure 1a, and the internal structure can be changed according to a purpose of the resin body.

The resin body 10 according to the present embodiment includes the core member 1 including the planar structure 1b covering the topologically optimized internal structure 1a, and the resin face material 2 containing resin is joined thereto so as to cover the surface of the planar structure 1b. Since the planar structure 1b of the core member 1 is joined to the resin face material 2 by face bonding, it is possible to increase a bonding strength of the resin face material 2 to the core member 1 in comparison with the line bonding or the spot bonding.

Further, it is not necessary to provide an adhesive film between the core member 1 and the resin face material 2, so it is possible to reduce a weight of the resin body 10 and to reduce a manufacturing cost thereof.

Further, since a joining portion of the core member 1 to the resin face material 2 has a planar structure, it is possible to restrain the resin contained in the resin face material 2 from flowing into the internal structure 1a. Accordingly, in a case where the resin contained in the resin face material 2 is fiber reinforced resin, a decrease in the resin-containing ratio is restrained, thereby making it possible to maintain the strength of the resin face material 2 and to decrease an amount of the fiber necessary to maintain the strength.

Further, in the resin body 10 according to the present embodiment, the resin face material 2 is joined so as to cover the surface of the planar structure 1b of the core member 1, and the resin face material 2 receives a compressive load and a tension load.

A material constituting the core member 1 is not limited in particular, but a well-known material is usable according to a purpose. For example, the material may be resin, metal, and the like.

The resin for forming the core member 1 may be polypropylene (PP) resin, polyamide (PA) resin, and the like, for example.

Further, from the viewpoint of improving mechanical strength, a fiber may be added to the resin for forming the core member 1. The fiber to be added may be, for example: resin fibers such as an aramid fiber, a cellulosic fiber, a nylon fiber, a vinylon fiber, a polyester fiber, a polyolefin fiber, and a rayon fiber; a carbon fiber; a glass fiber, a metal fiber; and the like fibers. From the viewpoint of further improving the mechanical strength, the carbon fiber (CF) and the glass fiber are preferable in particular.

The metal for forming the core member 1 may be aluminum, titanium, nickel, and the like. The metal such as aluminum, titanium, and nickel may be alloy, and an example of the nickel alloy is Inconel.

The internal structure 1a and the planar structure 1b in the core member 1 may be made of the same material, e.g., the same resin or the same metal, or may be made of different materials. For example, from the viewpoint of increasing geometrical-moment of inertia by increasing a plate thickness of the planar structure 1b while achieving improvement of the strength of the internal structure 1a, improvement of the bonding strength between the planar structure 1b and the resin face material 2, and a weight reduction, the internal structure 1a in the core member 1 may be made of metal, e.g., aluminum, and the planar structure 1b in the core member 1 may be made of resin. By increasing the geometrical-moment of inertia, it is possible to restrain displacement and improve durability in the resin body 10.

By combining the materials for forming the internal structure 1a and the planar structure 1b in the core member 1 by use of FEM (a finite element method), it is possible to manufacture a more optimum resin body 10 (e.g., with a light weight, a high strength, and a high rigidity).

It is preferable for the planar structure 1b to have an uneven portion (a porous portion) on its surface. It is possible to further improve the bonding strength between the planar structure 1b and the resin face material 2 by an anchor effect, and it is possible to firmly integrate the core member 1 with the resin face material 2. A shape of the uneven portion is not limited in particular, provided that the bonding strength between the planar structure 1b and the resin face material 2 can be increased by the anchor effect, and the uneven portion may be minute irregularities with a depth of a few micrometers.

An example of the resin contained in the resin face material 2 may be thermoplastic resin or thermosetting resin. The core member 1 can be joined to the resin face material 2 containing the thermoplastic resin or the thermosetting resin by deposition, insert molding, and the like, for example. On that account, an adhesive is unnecessary to join the core member 1 to the resin face material 2, which makes it possible to attain a weight reduction of the resin body and a cost reduction.

Further, it is preferable that the resin be fiber reinforced resin having an improved strength by adding a fiber thereto. A state of the resin is not limited in particular, and a fiber in a well-known state is usable according to a purpose. The state of the fiber used in the present embodiment may be a woven fabric and a non-woven fabric, for example.

The thermoplastic resin is not limited in particular, and may be, for example, polycarbonate resin, polyamide (PA) resin, polyurethane (PU) resin, polychlorinated vinyl resin, acrylonitrile-butadiene-styrene copolymer (ABS) resin, and polypropylene (PP) resin. The PA resin and the PP resin are preferable in particular.

Further, the thermoplastic resin may be thermoplastic fiber reinforced resin to which a fiber is added. The fiber contained in the thermoplastic fiber reinforced resin is not limited in particular, and may be, for example: resin fibers such as an aramid fiber, a cellulosic fiber, a nylon fiber, a vinylon fiber, a polyester fiber, a polyolefin fiber, and a rayon fiber; a carbon fiber; a glass fiber, a metal fiber, and the like fibers. The carbon fiber that can achieve a high mechanical strength is preferable in particular.

The thermosetting resin is not limited in particular, and may be, for example, vinyl ester resin, unsaturated polyester resin, phenolic resin, epoxy resin, and urethane resin. The epoxy resin is preferable in particular.

Further, the thermoplastic resin may be thermosetting fiber reinforced resin to which a fiber is added. The fiber contained in the thermosetting fiber reinforced resin is not limited in particular, and may be, for example: resin fibers such as an aramid fiber, a cellulosic fiber, a nylon fiber, a vinylon fiber, a polyester fiber, a polyolefin fiber, and a rayon fiber; a carbon fiber; a glass fiber; a metal fiber; and the like fibers. The carbon fiber that can achieve a high mechanical strength is preferable in particular.

[Manufacturing Method of Resin Body] The following describes one embodiment of a manufacturing method for manufacturing the resin body 10 according to the present embodiment. The manufacturing method of the resin body 10 according to the present embodiment includes: a step of manufacturing a core member 1; and a step of joining a resin face material 2 thereto so as to cover a surface of a planar structure 1b.

The manufacturing method of the resin body 10 according to the present embodiment includes a step of manufacturing the core member 1 including a topologically optimized internal structure 1a and a planar structure 1b covering the internal structure 1a. The core member 1 including the topologically optimized internal structure 1a is manufactured in the following procedures, for example.

First, a design region is determined in a material for forming the core member 1. In the design region thus determined, a load is set in a given direction and a part (a part that contributes to rigidity) that requires the material for an expected load state and a part (a part that hardly contributes to the rigidity) that does not require the material are found by use of a finite element method (FEM) or the like, and then, optimization for the purpose of minimizing a mass is performed with the rigidity (a buckling load, displacement, and the like) as a constraint. Hereby, data of the internal structure 1a topologically optimized to satisfy a lower volume, a lighter weight, a higher strength, and a higher rigidity than the conventional honeycomb structure is obtained in a short time. Further, unlike the honeycomb structure, the material and the specification of the size are not limited, so the internal structure 1a can be changed according to a purpose of the resin body 10.

Subsequently, an internal structure 1a to be obtained by topological optimization is manufactured by use of a 3D printer based on data of the topologically optimized internal structure 1a. The topologically optimized internal structure 1a has a complicated structure, but by use of the 3D printer, it is possible to easily manufacture the core member including the topologically optimized internal structure 1a.

The planar structure 1b covering the internal structure 1a may be also manufactured by use of the 3D printer. By use of the 3D printer, it is possible to easily form the planar structure 1b having a closed-section structure so as to cover the topologically optimized internal structure 1a.

In a case where the 3D printer is used for the manufacture of the core member 1, data of the topologically optimized internal structure 1a and data of the planar structure 1b are input into the 3D printer. Based on the data thus input, the core member 1 is manufactured by an output from the 3D printer.

Further, as a method for manufacturing the topologically optimized internal structure 1a, a well-known topology optimization analysis method and an analysis device may be used such that, after data of the topologically optimized internal structure 1a is obtained, this data and data of the planar structure 1b are input into the 3D printer, so as to manufacture the core member 1 including the topologically optimized internal structure 1a and the planar structure 1b.

Further, in the step of manufacturing the core member 1, an uneven portion may be formed on a surface of the planar structure 1b. As a method for forming the uneven portion on the surface of the planar structure 1b, there are, for example, a method for forming the planar structure 1b having irregularities on its surface by the 3D printer, a method for forming the uneven portion on the planar structure 1b by a discharge treatment, and other well-known methods.

The manufacturing method of the resin body 10 according to the present embodiment includes the step of joining the resin face material 2 so as to cover the surface of the planar structure 1b after manufacturing the core member 1. By joining the planar structure 1b in the core member 1 to the resin face material 2, the resin body 10 is obtained.

As described above, the resin contained in the resin face material 2 may be thermoplastic resin or thermosetting resin. Further, it is preferable that the resin be fiber reinforced resin having an improved strength by adding a fiber thereto.

In a case where the thermosetting resin is used as the resin contained in the resin face material 2, it is preferable to join the resin face material 2 by insert molding so as to cover the surface of the planar structure 1b in the step of joining. Further, the thermosetting resin may be cured at the time of joining.

Due to the insert molding, an adhesive is unnecessary at the time of joining the core member 1 to the resin face material 2, thereby making it possible to shorten a step operation time.

In a case where the thermoplastic resin is used as the resin contained in the resin face material 2, it is preferable to join the resin face material 2 by deposition so as to cover the surface of the planar structure 1b in the step of joining.

Since the thermoplastic resin is used as the resin contained in the resin face material 2, an adhesive is unnecessary at the time of joining the core member 1 to the resin face material 2. Further, it is possible to join the planar structure 1b in the core member 1 to the resin face material 2 by the deposition, thereby making it possible to shorten the step operation time (tact time), and to achieve a weight reduction of the resin body and a reduction in a manufacturing cost due to the adhesive being unnecessary. Further, recycling of the resin is achievable by using the thermoplastic resin as the resin.

A method for joining the resin face material 2 so as to cover the surface of the planar structure 1b by welding the resin face material 2 containing the thermoplastic resin to the core member 1 is not limited in particular, and various well-known deposition methods are usable. The deposition method that can be used in the present embodiment may be, for example, ultrasonic welding, vibration welding, guidance deposition, high-frequency deposition, laser deposition, thermal welding, and spin welding.

The vibration welding is a method in which, in a state where a load is applied, by use of a pressing machine or the like, to the core member 1 and the resin face material 2 to be welded, one of the core member 1 and the resin face material 2 is vibrated horizontally to a contact face between the core member 1 and the resin face material 2, so as to weld them by use of frictional heat generated by the vibration.

The ultrasonic welding is a method in which electric energy is converted into vibrational energy by an ultrasonic wave oscillator, and the vibrational energy is applied to the contact face between the core member 1 and the resin face material 2 that make contact with each other, so as to weld them by use of frictional heat generated on the contact face.

The following describes the steps at the time of manufacturing the resin body 10 according to the present embodiment by the thermal welding, with reference to FIGS. 2A to 2D. FIGS. 2A to 2D are a schematic configuration diagram illustrating the steps in the manufacturing method of the resin body according to one embodiment of the present disclosure.

Figure 2A:
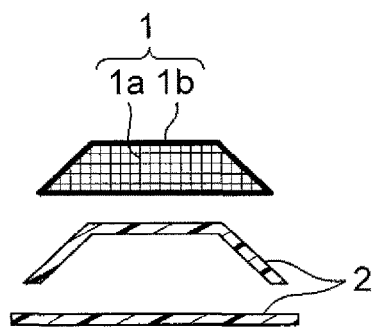
FIG. 2A is a schematic configuration diagram illustrating step in a manufacturing method of the resin body according to one embodiment of the present disclosure.

As illustrated in FIG. 2A, first, a core member 1 including a topologically optimized internal structure 1a and a planar structure 1b, and a resin face material 2 are prepared.

Figure 2B:
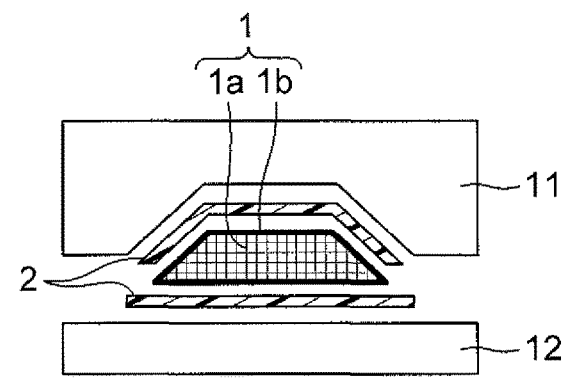
FIG. 2B is a schematic configuration diagram illustrating step in a manufacturing method of the resin body according to one embodiment of the present disclosure.

Subsequently, as illustrated in FIG. 2B, the core member 1 and the resin face material 2 are placed in dies 11, 12. Then, while the core member 1 and the resin face material 2 are attached to each other by pressure, a boundary surface between the core member 1 and the resin face material 2 is heated by a hot plate, IR (infrared), IH (induction heating), and the like, so as to join the core member 1 to the resin face material 2.

Figure 2C:
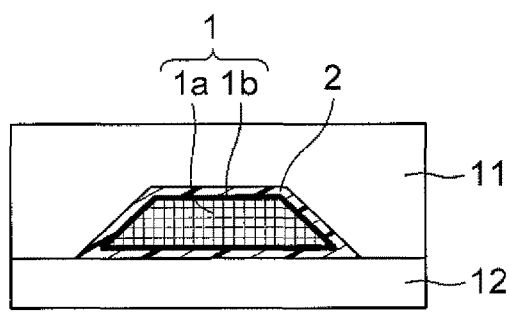
FIG. 2C is a schematic configuration diagram illustrating step in a manufacturing method of the resin body according to one embodiment of the present disclosure.
Figure 2D:
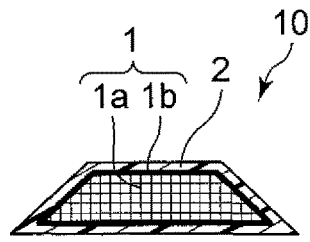
FIG. 2D is a schematic configuration diagram illustrating step in a manufacturing method of the resin body according to one embodiment of the present disclosure.

Then, as illustrated in FIG. 2C, the core member 1 and the resin face material 2 are cooled down in a state where the core member 1 and the resin face material 2 are pressurized by use of the dies 11, 12. Hereby, as illustrated in FIGS. 1 and 2D, the resin body 10 including the core member 1 and the resin face material 2 is obtained.

In a case where the thermoplastic resin is used as the resin contained in the resin face material 2, the method for joining the core member 1 to the resin face material 2 is not limited to the deposition, but insert molding in the dies may be employed. Since an adhesive is unnecessary at the time of joining the core member 1 to the resin face material 2 by the insert molding, it is possible to shorten the step operation time and to achieve the weight reduction of the resin body and the reduction in the manufacturing cost.

The resin body according to the present embodiment is not limited in particular, but may be, for example, pedal parts such as an accelerator and a brake, arm parts for a chassis such as a lower arm, and car components such as an injector cover protector.

What is claimed is:

1. A resin body comprising:
   a core member including an internal structure and a planar structure covering the internal structure, wherein the internal structure is comprised of metal and the planar structure is comprised of resin; and
   a resin face material containing resin and joined so as to cover a surface of the planar structure on an opposite side to a side where the planar structure covers the internal structure:
   wherein the planar structure has an uneven portion on a surface thereof.

2. The resin body according to claim 1, wherein the resin face material resin is thermoplastic resin or thermosetting resin.

3. The resin body according to claim 1, wherein the resin face material resin is fiber reinforced resin to which a fiber is added.

4. The resin body according to claim 1, wherein the internal structure is topologically optimized and is not a honeycomb structure.

5. A manufacturing method for manufacturing the resin body according to claim 1, the manufacturing method comprising:
   manufacturing the core member; and
   joining the resin face material so as to cover the surface of the planar structure.

6. The manufacturing method according to claim 5, wherein
   at the time of joining, the resin face material is joined by insert molding so as to cover the surface of the planar structure.

7. The manufacturing method according to claim 5, wherein:
   the resin face material resin is thermoplastic resin; and
   at the time of joining, the resin face material is joined by deposition so as to cover the surface of the planar structure.

8. The resin body according to claim 1, wherein
   the uneven portion is a porous portion.

\* \* \* \* \*